（12）United States Patent
Park

(10) Patent No.: US 11,026,493 B2
(45) Date of Patent: Jun. 8, 2021

(54) ECO-FRIENDLY BRUSH

(71) Applicant: Sung Ho Park, Gyeonggi-do (KR)

(72) Inventor: Sung Ho Park, Gyeonggi-do (KR)

(73) Assignee: Sung Ho Park, Gyeonggi-do (KR)

( * ) Notice: Subject to any disclaimer, the term of this patent is extended or adjusted under 35 U.S.C. 154(b) by 0 days.

(21) Appl. No.: 16/723,114

(22) Filed: Dec. 20, 2019

(65) Prior Publication Data

US 2020/0281341 A1   Sep. 10, 2020

(30) Foreign Application Priority Data

Mar. 6, 2019 (KR) .................. 10-2019-0025558

(51) Int. Cl.
*A46B 13/02* (2006.01)
*A45D 34/04* (2006.01)
*C08L 67/04* (2006.01)

(52) U.S. Cl.
CPC ............ *A45D 34/042* (2013.01); *A46B 13/02* (2013.01); *C08L 67/04* (2013.01); *A45D 2200/10* (2013.01)

(58) Field of Classification Search
CPC ................................ A46B 7/04; A45D 34/042
See application file for complete search history.

(56) References Cited

U.S. PATENT DOCUMENTS

| | | | | | |
|---|---|---|---|---|---|
| 2,840,841 | A | * | 7/1958 | Maxwell | A46B 15/00 15/193 |
| 3,136,582 | A | * | 6/1964 | Locher | A46D 3/045 300/19 |
| 3,177,038 | A | * | 4/1965 | Paccione | A46B 15/00 300/21 |
| 6,321,408 | B1 | * | 11/2001 | Esterson | A46B 7/04 15/143.1 |

(Continued)

FOREIGN PATENT DOCUMENTS

| | | |
|---|---|---|
| JP | 03125230 U | 8/2006 |
| KR | 1020060134872 A | 12/2006 |
| KR | 1020190009443 A | 1/2019 |

OTHER PUBLICATIONS

Office Action of Korean Application No. 10-2019-0025558, dated Apr. 29, 2020, 8 pages.

(Continued)

*Primary Examiner* — Michael D Jennings
(74) *Attorney, Agent, or Firm* — Fay Sharpe LLP

(57) ABSTRACT

An eco-friendly brush is disclosed. The present disclosure relates to an eco-friendly brush in which the brush may be biodegraded at disposal, thereby preventing environmental pollution, even solving harmful problems caused by the adhesive, and enabling various types of bristle bundles to be interchangeably installed. As an exemplary embodiment, the present disclosure is provided to include: a handle made of biodegradable resin; a neck part made of the biodegradable resin, and having the rear end part thereof to which the front (Continued)

end part of the handle is detachably coupled; a brush fixing ring made of the biodegradable resin, and having the rear end thereof to which the front end part of the neck part is detachably coupled; and a head part inserted into a rear end part of the brush fixing ring and fixed therein, and having a bristle bundle integrally implanted on the front surface thereof.

5 Claims, 3 Drawing Sheets

(56) References Cited

U.S. PATENT DOCUMENTS

| | | | | |
|---|---|---|---|---|
| 8,230,543 | B2 * | 7/2012 | Shrier | A46B 7/04 |
| | | | | 15/145 |
| 2002/0148058 | A1 * | 10/2002 | Greenwood | A46B 7/04 |
| | | | | 15/168 |
| 2016/0360873 | A1 * | 12/2016 | Hobbs | A46B 9/025 |
| 2019/0191864 | A1 * | 6/2019 | Pilevsky | A46B 9/06 |

OTHER PUBLICATIONS

Decision to Grant a Patent for Korean Application No. 10-2019-0025558, dated Nov. 25, 2020, 3 pages.

* cited by examiner

ECO-FRIENDLY BRUSH

CROSS REFERENCE TO RELATED APPLICATION

The present application claims priority to Korean Patent Application No. 10-2019-0025558, filed Mar. 6, 2019, the entire contents of which is incorporated herein for all purposes by this reference.

BACKGROUND OF THE INVENTION

Field of the Invention

The present disclosure relates to a makeup brush.

Description of the Related Art

In general, a makeup brush relates to a brush used for evenly applying and spreading powder or liquid form cosmetics on the skin, and has various sizes, lengths, and shapes that are suitable for use in applying foundation, shading, powder, rouge for cheek, highlights, shadow, blusher, and the like, and suitable to cosmetics application areas such as facial skin, eyes, cheeks, lips, eyebrows, eyelashes, and the like.

Such a makeup brush is usually composed of a handle that may be gripped by a user, and a brush which is provided at the front end of the handle and is composed of a plurality of bristles.

As an example of such a makeup brush, Korean Patent Application Publication No. 10-2006-0134872 (published on Dec. 28, 2006) discloses a makeup brush configured to include: a brush main body having a bristle bundle fixed to one side thereof and a coupling hole provided at the other side thereof; and a brush handle inserted into and coupled to the coupling hole of the brush main body.

In addition, Korean Patent Application Publication No. 10-2019-0009443 (published Jan. 29, 2019) discloses a makeup brush including: a brush main body provided with a brush body and a coupling head prepared on the brush body; a brush bristle part coupled to the coupling head and provided with a bristle member; a support member disposed between the coupling head and the brush bristle part to support the brush bristle part; and a coupling part coupled to the coupling head to surround the lower part of the brush bristle part and the outer wall of the coupling head, and thus coupling the brush bristle part to the coupling head.

However, in the case of the conventional makeup brushes, although the makeup brushes are made of wood or metal material except bristles, synthetic resin makeup brushes have been the mainstream in recent years. These makeup brushes have problems in that the discarded synthetic resin makeup brushes do not decompose after the end of service life, and become a waste that causes environmental pollution.

In addition, in the case of the conventional makeup brush, a large amount of adhesive is often used for fixing bristles, or for assembling and connecting parts, so there is a problem in that allergies or skin troubles may be caused when such a makeup brush is used.

Documents of Related Art (Patent Document 1) Korean Patent Application Publication No. 10-2006-0134872 (published Dec. 28, 2006)

(Patent Document 2) Korean Patent Application Publication No. 10-2019-0009443 (published Jan. 29, 2019)

SUMMARY OF THE INVENTION

The objective of the present disclosure is to provide an eco-friendly brush that is biodegraded at disposal and does not cause environmental pollution, and that may solve a harmful problem caused by the adhesive.

The objective of the present disclosure is also to provide an eco-friendly brush in which various shapes of bristle bundles are interchangeably installed.

In addition, the present disclosure should not be limited to the technical challenges described herein, but it is apparent that other technical challenges could also be derived from the description disclosed herein.

As an exemplary embodiment, the present disclosure discloses an eco-friendly brush including: a handle made of biodegradable resin; a neck part made of the biodegradable resin, and having a rear end part of the neck part detachably coupled to a front end part of the handle; a brush fixing ring made of the biodegradable resin, and having a rear end part of the brush fixing ring detachably coupled to a front end part of the neck part; and a head part inserted into the rear end part of the brush fixing ring and fixed in the brush fixing ring, and having a bristle bundle integrally implanted on a front surface of the head part.

According to a preferred feature of the present disclosure, the handle, the neck part, and the brush fixing ring may be made of polylactic acid resin (PLA: Poly Lactic Acid).

According to the eco-friendly brush based on the exemplary embodiment of the present disclosure, since the handle, the neck part, and the brush fixing ring are made of the biodegradable resin and are thus biodegraded at disposal, the eco-friendly brush has a benefit of not causing environmental pollution.

In addition, according to the eco-friendly brush based on the exemplary embodiment of the present disclosure, since the neck part and the brush fixing ring are detachably coupled to the handle sequentially without using the adhesive, the head part in which the bristle bundle is integrally implanted is connected and fixed to the handle, thereby giving a benefit of preventing allergies or skin troubles caused by harmful components of the adhesive when using.

In addition, according to the eco-friendly brush based on the exemplary embodiment of the present disclosure, since the head part in which the bristle bundle is integrally implanted is fixedly connected so as to be interchangeable between the neck part and the brush fixing ring, the head part having various shapes of bristle bundles may be used in one handle depending on the purpose of use and the skin area of use, thereby giving a benefit of increasing the ease of use.

The effects of the present invention are not limited to the above-mentioned effects, and other effects not described above will be clearly understood by those skilled in the art from the description of the claims.

DETAILED DESCRIPTION OF THE INVENTION

Figure 1:
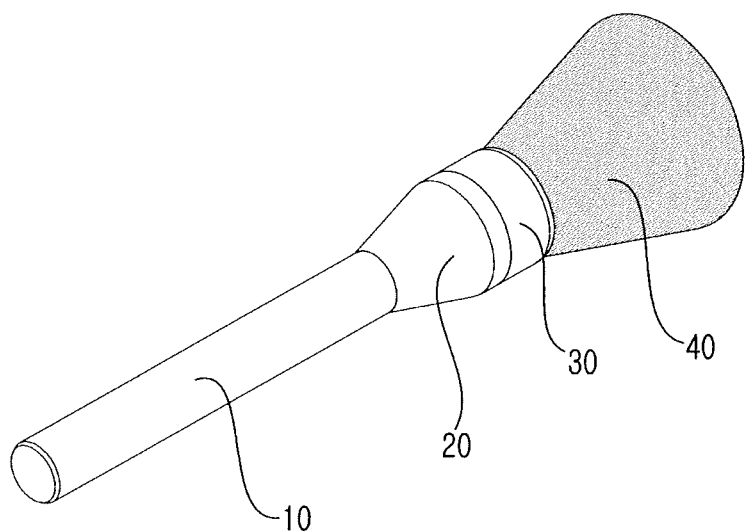
FIG. 1 is a perspective view of an eco-friendly brush according to an exemplary embodiment of the present disclosure.

Hereinafter, with reference to the accompanying diagrams, a configuration, operation, and effect of a preferred exemplary embodiment will be described. For reference, in the diagrams, each component is omitted or schematically illustrated for convenience and clarity, and the size of each component does not reflect the actual size. In addition, the same reference numerals throughout the specification refer to the same components, and the reference numerals for the same components in the individual diagrams will be omitted.

Figure 2:
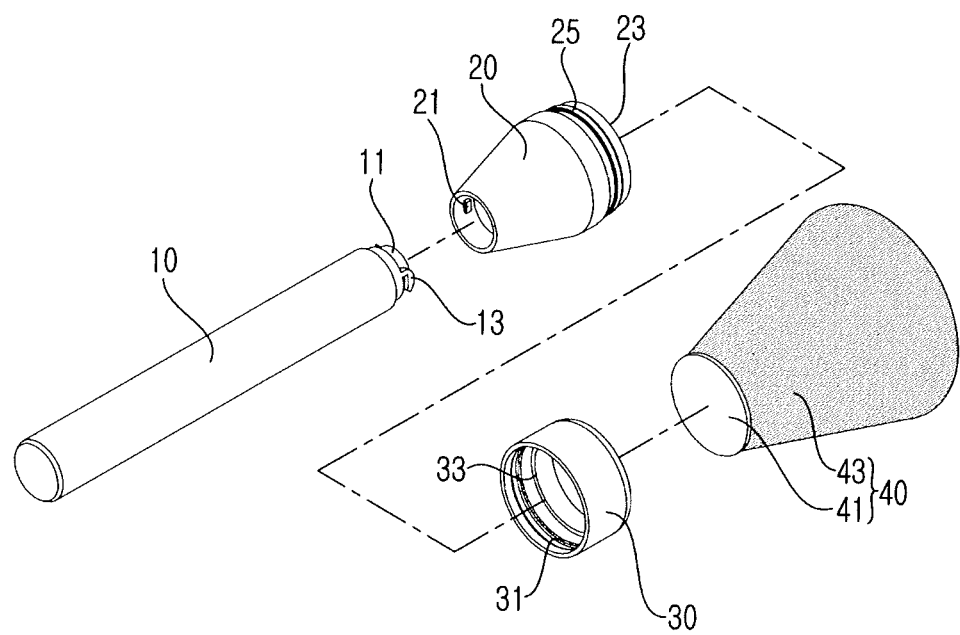
FIG. 2 is an exploded perspective view of the eco-friendly brush according to the exemplary embodiment of the present disclosure.
Figure 3:
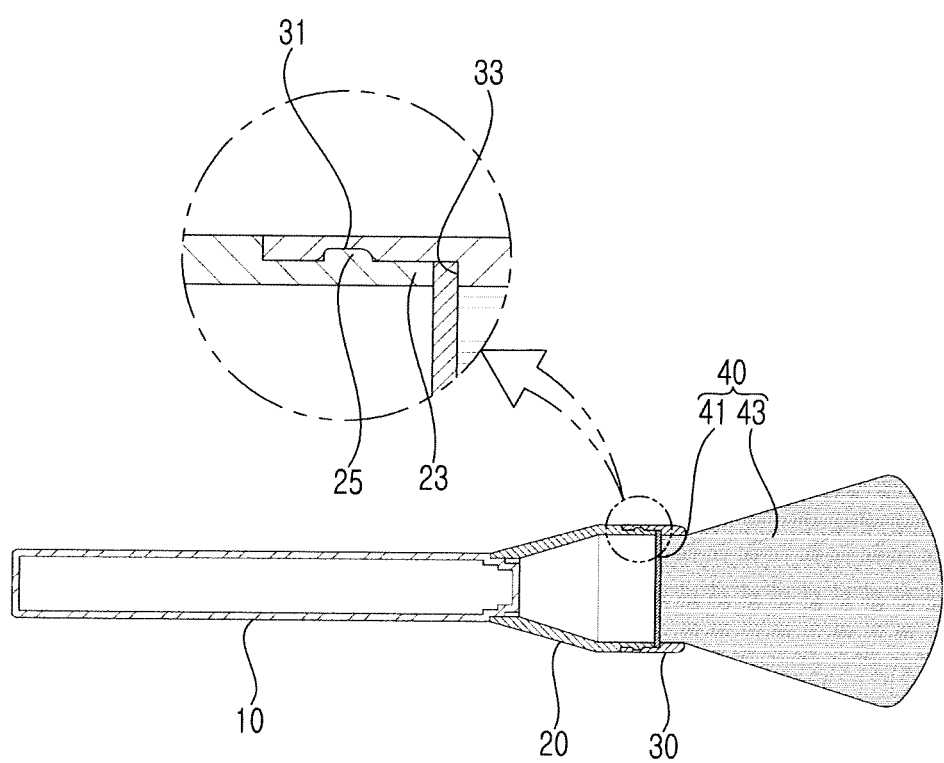
FIG. 3 is a cross-sectional view of the eco-friendly brush according to the exemplary embodiment of the present disclosure.

As shown in FIGS. 1 to 3, an eco-friendly brush according to an exemplary embodiment of the present disclosure includes: a handle 10 made of biodegradable resin; a neck part 20 made of the biodegradable resin, and having a rear end part detachably coupled to a front end part of the handle 10; a brush fixing ring 30 made of the biodegradable resin, and having a rear end part of the brush fixing ring detachably coupled to a front end part of the neck part 20; and a head part 40 inserted into the rear end part of the brush fixing ring 30 and fixed in the brush fixing ring 30, and having a bristle bundle 43 integrally implanted on a front surface of the head part.

Here, the handle 10 is a component member that enables a user to grip the eco-friendly brush according to the exemplary embodiment of the present disclosure. The handle 10 may be provided, for example, in a rod shape having a cross section of a circle, an ellipse, a polygon, and the like, and may be provided in a shape being extended while having the same cross section, or in a shape tapering toward the rear of the handle.

In addition, the handle 10 is preferably made of the biodegradable resin such as, for example, polylactic acid resin (PLA: Poly Lactic Acid), instead of general synthetic resin, so as to prevent environmental pollution by being biodegraded at disposal.

The neck part 20 is detachably coupled to the front end part of the handle 10 described above. The neck part 20 is a kind of connection member for connecting the head part 40, in which the bristle bundle 43 is integrally implanted, to the handle 10 together with the brush fixing ring 30 to be described later, and has a tubular shape extending, toward the front of the neck part, to have a diameter corresponding to the brush fixing ring 30.

In addition, the neck part 20 is preferably provided to be coupled to the handle 10 by being fitted into the front end part of the handle and rotating at a predetermined angle in one direction, and to be separated from the handle by rotating in the opposite direction. To this end, the front end part of the handle 10 is provided with a coupling protrusion 11 provided with a locking step 13 having a rotational coupling type. Also, on the inner circumferential surface of the rear end part of the neck part 20, a locking protrusion 21 coupled to the locking step 13 having the rotational coupling type is provided to protrude.

In addition, the neck part 20 is preferably made of the biodegradable resin such as, for example, polylactic acid resin (PLA: Poly Lactic Acid), instead of general synthetic resin, so as to prevent environmental pollution by being biodegraded at disposal.

The brush fixing ring 30 is detachably coupled to the front end part of the neck part 20 described above. The brush fixing ring 30 is a kind of connection member for connecting the head part 40, in which the bristle bundle 43 is integrally implanted, to the handle 10 together with the neck part 20 described above, and has a typical ring shape that the head part 40 may be inserted and fixed.

In addition, it is preferable that the brush fixing ring 30 is detachably coupled by press-fitting to the front end part of the neck part 20 described above. To this end, at the front end part of the neck part 20, an insertion ring part 23 inserted into the brush fixing ring 30 is provided to protrude, and at the same time, on an outer circumferential surface of the insertion ring part 23, a press-fitting protrusion 25 is provided to protrude. Also, on an inner circumferential surface of the brush fixing ring 30, a press-fitting groove 31, having a ring shape, corresponding to the press-fitting protrusion 25 of the insertion ring part 23 is provided.

In addition, the brush fixing ring 30 is preferably made of the biodegradable resin such as, for example, polylactic acid resin (PLA: Poly Lactic Acid), instead of general synthetic resin, so as to prevent environmental pollution by being biodegraded at disposal.

The head part 40 is inserted into the rear end part of the brush fixing ring 30 described above and fixed to the brush fixing ring 30. The head part 40 is a component member in which the bristle bundle 43 for brushing is integrally implanted on the front surface and used for, for example, applying and spreading cosmetics.

It is preferable that the head part 40 is provided by bonding and fixing the rear end of the bristle bundle 43 in a state where the resin material applied on a head plate 41 is heated. The head plate 41 may be provided of, for example, a circular metal plate or a high strength synthetic resin plate. Natural hairs may be applied to the bristles which form the bristle bundle 43. Also, the head plate 41 may be made of synthetic resin containing a large amount of biodegradable resin such as polylactic acid resin (PLA: Poly Lactic Acid).

The bristle bundle 43 implanted on the head plate 41 has a tendency to radially spread toward the front. Accordingly, it is difficult for the bristle bundle to be inserted into the rear end part of the brush fixing ring 30. In order to solve this problem, it is preferable that the head part 40 in which the bristle bundle 43 is integrally implanted is to be inserted into the brush fixing ring 30 by entering from the rear to the front of the brush fixing ring through a soft guide sleeve (not shown) capable of being inserted into the rear end part of the brush fixing ring 30.

At this time, while the head plate 41 of the head part 40 is pushed into the soft guide sleeve and the bristle bundle 43 is positioned in the soft guide sleeve, the soft guide sleeve is inserted into the rear end part of the brush fixing ring 30. After that, by pushing the head plate 41, and at the same time, by separating the guide sleeve from the brush fixing ring 30, the insertion of the bristle bundle is completed.

In addition, a support step 33 is provided to protrude on the inner circumferential surface of the front end part of the brush fixing ring 30 to prevent the head part 40, particularly the head plate 41, from detaching forward through the brush fixing ring 30.

In the case of the eco-friendly brush according to the exemplary embodiment of the present disclosure, as the handle 10, the neck part 20, and the brush fixing ring 30 are made of the biodegradable resin, when using, there is no fear of generating the environmental hormones, and when disposing, the handle 10, the neck part 20, and the brush fixing ring 30 are biodegraded in a natural state, thereby not causing environmental pollution.

In addition, in the case of the eco-friendly brush according to the exemplary embodiment of the present disclosure, the neck part 20 and the brush fixing ring 30 are detachably coupled to the handle 10 sequentially without using the adhesive, so that the head part 40 including the bristle bundle 43 is connected and fixed, whereby when using, allergies or skin troubles due to harmful components of the adhesive may be prevented.

In addition, in the case of the eco-friendly brush according to the exemplary embodiment of the present disclosure, since the head part 40 in which the bristle bundle 43 is integrally implanted is fixedly connected to be interchangeable between the neck part 20 and the brush fixing ring 30, the head part 40 having various types of the bristle bundle 43 may be interchanged, and may be used in one handle 10 depending on the purpose of use and the skin area of use, and thus the ease of use is increased, and at the same time, the number of the handles 10 may be significantly reduced compared with the number of the head parts 40, thereby becoming eco-friendly.

Although preferred exemplary embodiments of the present invention have been described above with reference to the accompanying diagrams, the exemplary embodiments described in the description and the configurations illustrated in the diagrams are merely examples and do not exhaustively present the technical spirit of the present invention. Accordingly, it should be appreciated that there may be various equivalents and modifications that can replace the exemplary embodiments and the configurations at the time at which the present application is filed. Therefore, the exemplary embodiments described shove are to be understood as illustrative and not restrictive in all aspects, and the scope of the present invention is indicated by the following claims rather than the detailed description, and the meaning and scope of the claims and their all changes or modifications derived from an equivalent concept should be construed as being included in the scope of the present invention.

What is claimed is:

1. An eco-friendly brush comprising:
    a handle made of biodegradable resin;
    a neck part made of the biodegradable resin, and having a rear end part of the neck part detachably coupled to a front end part of the handle;
    a brush fixing ring made of the biodegradable resin, and having a rear end part of the brush fixing ring detachably coupled to a front end part of the neck part; and
    a head part inserted into the rear end part of the brush fixing ring and fixed in the brush fixing ring, and having a bristle bundle integrally implanted on a front surface of the head part, wherein the head part in which the bristle bundle is integrally implanted is inserted from a rear to a front of the brush fixing ring through a guide sleeve, and on an inner circumferential surface.

2. The eco-friendly brush of claim 1, wherein the neck part is coupled to the handle by being fitted into the front end part of the handle and rotating at a predetermined angle, and the brush fixing ring is coupled by press-fitting to the front end part of the neck part.

3. The eco-friendly brush of claim 1, wherein the head part is provided by bonding and fixing a rear end of the bristle bundle in a state where resin material applied on a head plate is heated.

4. The eco-friendly brush of claim 1, wherein the handle, the neck part, and the brush fixing ring are made of polylactic acid resin (PLA: Poly Lactic Acid).

5. An eco-friendly brush comprising:
    a handle made of biodegradable resin;
    a neck part made of the biodegradable resin, and having a rear end part of the neck part detachably coupled to a front end part of the handle;
    a brush fixing ring made of the biodegradable resin, and having a rear end part of the brush fixing ring detachably coupled to a front end part of the neck part; and
    a head part inserted into the rear end part of the brush fixing ring and fixed in the brush fixing ring, and having a bristle bundle integrally implanted on a front surface of the head part, wherein the head part is provided by bonding and fixing a rear end of the bristle bundle in a state where resin material applied on a head plate is heated.

\* \* \* \* \*